United States Patent [19]

Killen

[11] 3,781,855

[45] Dec. 25, 1973

[54] FINGERPRINT IDENTIFICATION SYSTEM AND METHOD

[75] Inventor: Donald E. Killen, Dallas, Tex.

[73] Assignee: Identification Systems, Inc., Dallas, Tex.

[22] Filed: Mar. 13, 1970

[21] Appl. No.: 19,327

[52] U.S. Cl. .......................... 340/146.3 E, 324/71 R

[51] Int. Cl. .......................... G06k 9/12

[58] Field of Search ............ 324/65 R, 65 M, 71 R; 340/146.3 E, 166, 407, 146.3 R, 149; 73/104, 105, 150; 128/2.1 R, 2.1 A, DIG. 4

[56] References Cited

UNITED STATES PATENTS

| | | | |
|---|---|---|---|
| 3,622,989 | 11/1971 | Dowdy, Sr. | 340/146.3 E |
| 3,508,540 | 4/1970 | Cavallari, Jr. et al. | 128/2.1 R |
| 3,294,084 | 12/1966 | Schuler et al. | 128/2.06 E |
| 3,393,362 | 7/1968 | Wright et al. | 324/71 |
| 3,231,861 | 1/1966 | French | 340/146.3 |
| 2,856,582 | 10/1958 | Anderson | 324/65 |
| 3,005,154 | 10/1961 | Moore et al. | 324/65 |
| 2,621,232 | 12/1952 | Spalding | 324/65 |
| 3,411,136 | 11/1968 | Ellis, Jr. et al. | 340/166 |

*Primary Examiner*—Thomas A. Robinson
*Attorney*—H. Mathews Garland

[57] ABSTRACT

The specification discloses a matrix sensing device for sensing the pattern of the skin of a finger for comparison with measurements previously obtained and stored in a storage device for identification purposes. The matrix sensing device comprises a plurality of electrical conductance sensing means located in rows and columns in a planar surface for contacting the skin of a finger. Selection mean is provided for sequentially selecting each sensing means row by row for sequentially measuring the electrical conductance of the skin at a plurality of points in an orderly fashion. Initially, in a first cycle, the conductance is sequentially measured and an average value obtained. Subsequently, in a second cycle, each measurement obtained is compared to the average value. From the resulting measurements there is derived a signal image of the pattern of the skin of the finger for use for identification purposes.

27 Claims, 32 Drawing Figures

INVENTOR
Donald E. Killen
BY
W. Mathews Garland
ATTORNEY

INVENTOR
Donald E. Killen
BY
H. Mathews Garland
ATTORNEY

INVENTOR
Donald E. Killen
BY
H. Mathews Garland
ATTORNEY

INVENTOR
Donald E. Killen
BY [signature]
ATTORNEY

INVENTOR
Donald E. Killen
BY W. Mathews Garland
ATTORNEY

INVENTOR
Donald E. Killen
BY H. Mathews Garland
ATTORNEY

INVENTOR.
Donald E. Killen
BY
H. Mathews Garland
ATTORNEY

INVENTOR.
Donald E. Killen
BY
H. Mathews Garland
ATTORNEY

INVENTOR.
Donald E. Killen
BY W. Mathews Garland
ATTORNEY

FINGERPRINT IDENTIFICATION SYSTEM AND METHOD

BACKGROUND OF THE INVENTION

This invention relates to a method of and system for scanning and measuring the pattern of the skin of a human being for identification purposes.

The need for automatic means for identifying a human individual is widespread. A large number of people are subjected daily to identity verification in banking, commerce, industry, government, etc. Conventional means such as printed identification cards or inked fingerprints have disadvantages in that their use is time consuming; subject to human error; or subject to several varieties of fraud.

Optical devices for scanning the human finger for identification purposes have been suggested, however, the use of these devices have disadvantages in that the signal to noise ratio of the optical image of the finger is low. In this respect, the ratio of the light intensity of the ridges with respect to the valleys of the skin of the finger is nominal.

SUMMARY OF THE INVENTION

In one aspect of the present invention, the skin of the finger is scanned for an electrical property for identification purposes. Advantages result from such scanning operations in that a significantly larger signal to noise ratio and hence more accurate identification is obtainable.

In another aspect, there is provided a technique and system for obtaining a measure of a parameter of the skin of the finger at a plurality of different points. The parameter sensed at the plurality of different points is averaged and the average value is compared with the parameter sensed at each individual point in order to normalize the individual measurements.

The system for scanning a finger for an electrical property comprises a plurality of spaced electrical sensing means supported in a position to engage the skin of a finger. Means is provided for sequentially selecting different ones of the sensing means for obtaining a measure of the electrical property at a plurality of different points.

Normalized measurements are obtained with a system comprising means for obtaining a measure of the average value of the electrical property at a plurality of different points and means for comparing the average value to the measurements obtained at each of the different individual points.

In the embodiment disclosed, each sensing means comprises a pair of spaced first and second contacts for contacting the skin of a finger. A first set of electrical conducting means isolated from each other as well as a second set of electrical conducting means electrically isolated from each other and from the first set of conducting means also are provided. Each conducting means of the first set electrically connects together a plurality of different ones of the first set of contacts. In addition, each conducting means of the second set electrically connects together a plurality of different ones of the second set of contacts. Means is provided for sequentially and separately coupling a source of electrical current to each of the first conducting means. A gate system normally blocks the flow of current from each of the second conducting means. In addition, there is provided means for controlling the gate system to allow current sequentially and separately to flow from each of the second conducting means for sequentially obtaining a measure of the electrical property at a plurality of different points on the skin of the finger.

The electrical conducting means of said first set has surfaces in a plane exposed for contacting the skin of a finger. Each conducting means of the first set has a plurality of apertures extending therethrough. The conducting means of the second set are located below the first set and have contact members extending through the apertures of the conducting means of the first set. These contact members have a surface in said plane exposed for contacting the skin.

DETAILED DESCRIPTION OF THE INVENTION

Figure 1:
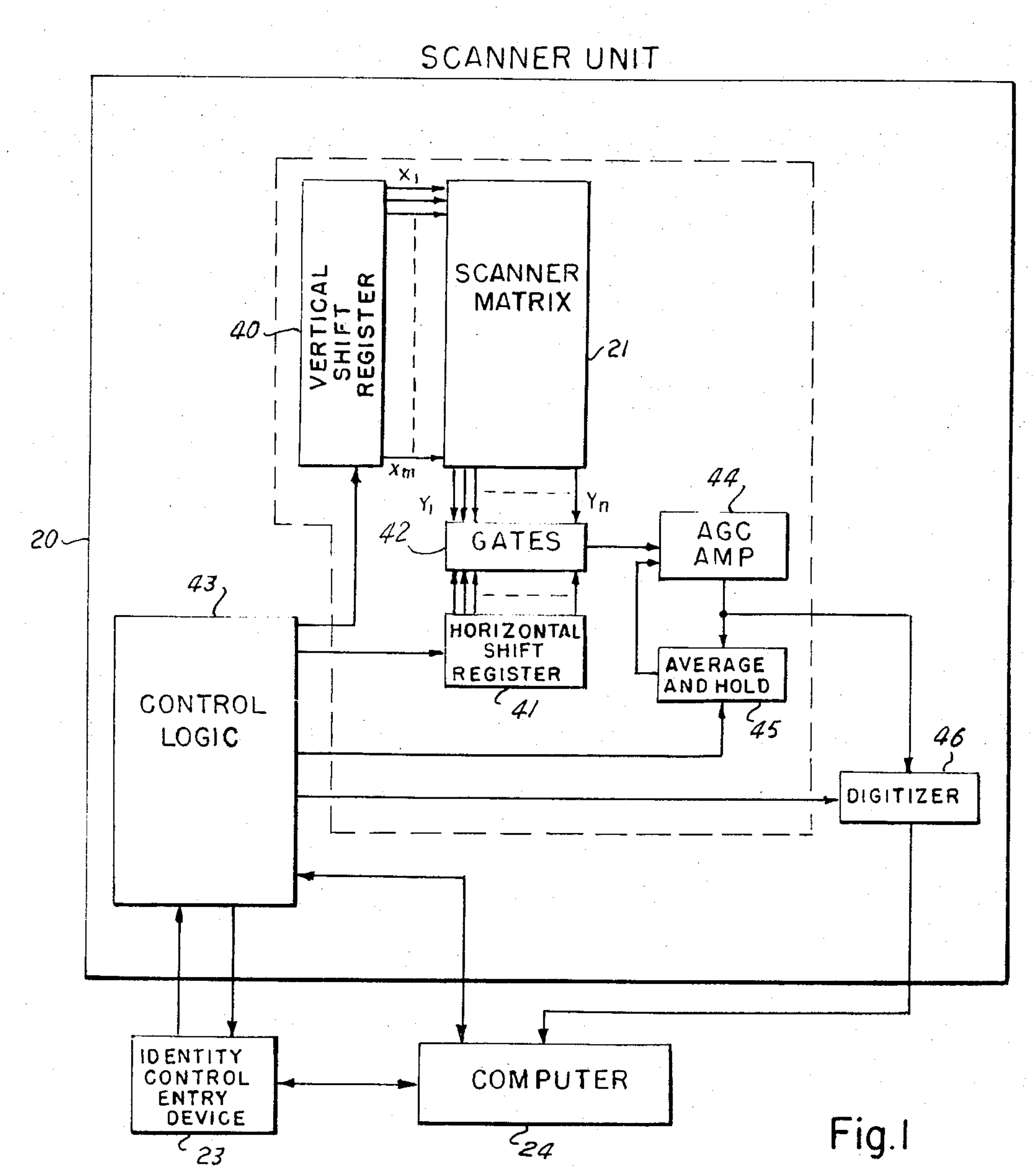
FIG. 1 illustrates in block diagram the scanning system of the present invention.
Figure 2:
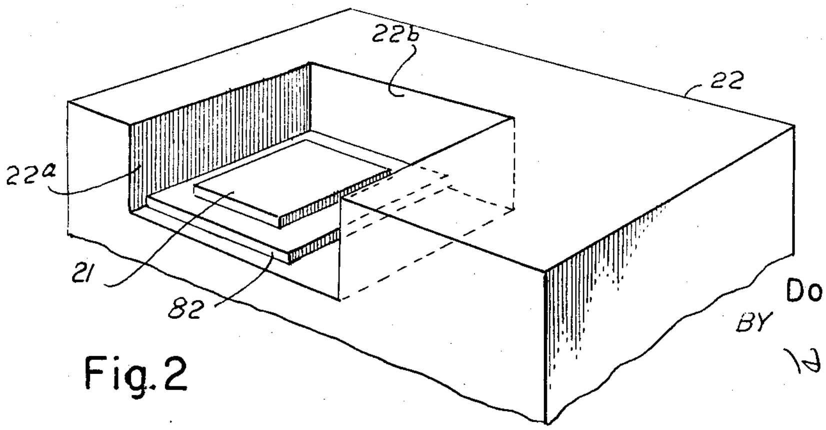
FIG. 2 illustrates the manner in which the scanning matrix may be located and supported to scan a finger.

Referring to FIG. 1, the system shown in the block 20 forms the basis of a personal identity verification system. It includes an electrical scanning matrix 21 for scanning the skin of the finger to obtain measurements of an electrical property of the skin at a plurality of points. Scanning is carried out by placing the finger in contact with the top surface of the matrix. As shown in FIG. 2, the matrix is mounted in a slot in a base 22 formed of insulating material. The finger is placed on top of the matrix with the walls 22*a* and 22*b* serving as guides. For verification purposes, an identity or control number may be entered into the device 23 of FIG. 1. This number along with the fingerprint image measured by the system 20 are transmitted to a computer 24. Stored in a computer are file images of fingerprints previously obtained. Associated with each file image is an identity number. The file image corresponding to the identity number entered in device 23 is selected and compared with the incident image. If the two are sufficiently alike, then verification is affirmed.

Figures 3, 4:
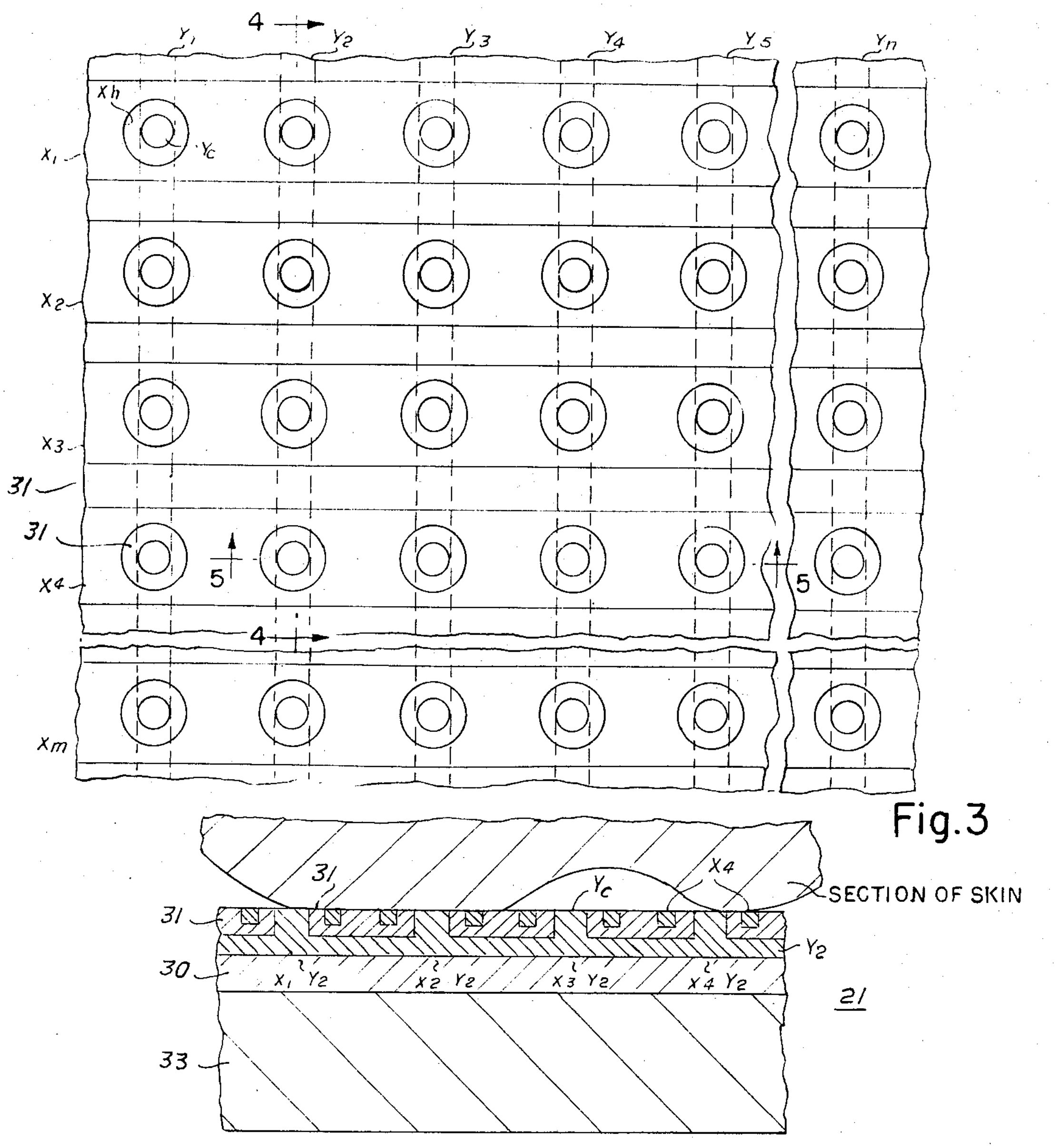
FIG. 3 is an enlarged illustration of one embodiment of a scanning matrix which may be employed to obtain the measurements.
FIG. 4 is a cross section taken through lines 4—4 of FIG. 3 and which also illustrates in cross section the ridges of a finger placed on the top surface of the scanning matrix.
Figure 5:
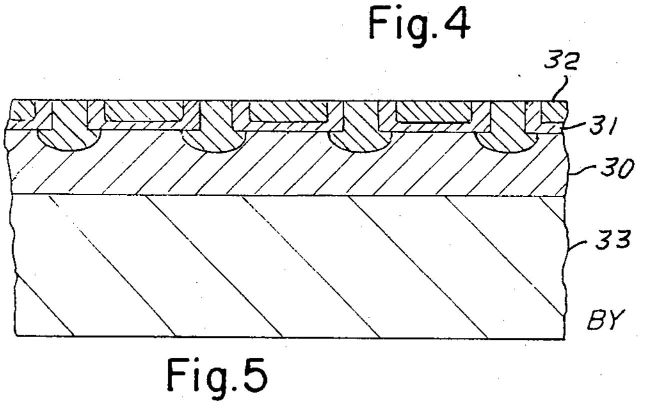
FIG. 5 is a cross section taken through lines 5—5 of FIG. 3.

Referring to FIGS. 3–5 the scanning matrix in one embodiment comprises a plurality of spaced, horizontal conductors $X_1$–$X_m$ and a plurality of spaced vertical conductors $Y_1$–$Y_n$. All of the horizontal or X conductors are low-resistivity conducting members electrically isolated or insulated from each other. In addition, all of the vertical or Y conductors are low-resistivity conducting members electrically isolated or insulated from each other and from the horizontal conductors. In the embodiment disclosed, at each point where the X and Y conductors intersect or cross each other, there is located an electrical contact pair. Each contact pair comprises a member extending from a Y- conductor and protruding through a hole formed in an X- conductor. Thus, the extending member and the surrounding area of the hole in an X-conductor form a contact pair.

In this respect, each X conductor has a plurality of holes $X_h$ extending therethrough while each Y conductor has a plurality of contact members $Y_c$ extending therefrom. The total number of holes in each X conductor is equal to n while the total number of contact members $Y_c$ extending from each Y conductor is equal to $m$. The Y conductors are located below the X conductors and are imbedded or diffused in high resistivity substrate 30. Deposited over these conductors and surrounding the $Y_c$ members is insulating material 31. Imbedded in the insulating material 31 are the X conductors but with their top surfaces in a plane exposed for contacting the skin of a finger. Insulation 31 insulates the X conductors from each other and from the Y conductors. Each contact member $Y_c$ of a Y conductor protrudes through a hole $X_h$ of an X conductor whereby its top surface is in the same plane as the top surface of the X conductor. Located within each hole and surrounding the $Y_c$ contact members is additional insulation 31 which insulates the $Y_c$ contact members from the X conductors. Thus the top surface of the matrix comprises insulation, the top surface of a plurality of X conductors, and the top surface of a plurality of $Y_c$ contact members, all of said top surfaces comprising a plane. The assembly shown is located on a supporting member 33 for mechanical rigidity. The member 33 is formed of insulating material. Contact of the finger with the top surface of the scanning matrix will result in the skin bridging different contact pairs depending upon the pattern of the ridges of the finger.

In this respect, the dimension of the matrix and the number of contact pairs are sufficient to provide an adequate number of data points for proper identification. The total number of contact pairs is equal to m·n. In one embodiment, 72 Y conductors and 144 X conductors may be provided with each contact pair spaced about 0.005 inch from an adjacent contact pair in the X and Y directions.

In the scanning operation, one X conductor and one Y conductor are selected to select a specific contact pair defined by the intersection of the selected X and Y conductors. During the selection of the X conductor a fixed potential, for example (5 volts), is applied thereto while all other X conductors are maintained at zero potential. Simultaneously, the selected Y conductor is gated to circuitry to obtain a measure of the flow of current in the localized conductance path between the area of the protruding $Y_c$ contact member or some portion of it and the area on the X conductor which surrounds the protruding $Y_c$ contact member. The measurements obtained will be of conductance or resistance of the skin however, the terms conductance or conductivity will be employed in the following description.

The conductance measured between a given contact pair will depend upon the amount of or lack of skin contact bridging the selected pair. In carrying out the scanning process, different contact pairs are sequentially selected to obtain a measure of the conductance at each pair. Thus, in FIG. 4, the four contact pairs shown will be selected at different times and the following will be observed. At contact pair $X_2$ $Y_2$ there is maximum skin contact and hence maximum current flow. At contact pair $X_3$ $Y_2$ there is no skin contact and hence minimum conductance while at contact pairs $X_1$ $Y_2$ and $X_4$ $Y_2$ there is partial contact and hence, a flow of current of intermediate value. Current flow through the skin contact is primarily through the papillary ridges whereby the skin conductance measured is primarily that due to these ridges.

Referring again to FIG. 1, a selection system suitable for carrying out the scanning process will be described briefly. This system comprises a vertical shift register 40, a horizontal shift register 41, and a gating system 42 all controlled by logic 43. Scanning of the matrix 21 is carried out from left to right, row by row, and from top to bottom. In this respect, each contact pair along the top X conductor is scanned beginning at the left and proceeding toward the right. Then the contact pairs along the next X conductor are scanned. The process proceeds until scanning is complete.

Prior to scanning, both the vertical and horizontal shift registers are reset to zero. A one bit then is placed in the first position of each register. This will select conductors $X_1$ and $Y_1$ whereby the corresponding contact pair is selected. The appropriate gate in the gating system 42 passes current flow to the measuring system. The one bit in the horizontal shift register then is shifted one position to the right to select conductors $X_1$ $Y_2$. Scanning a row thus consists of selecting an X conductor by placing a one bit in the appropriate position in the vertical shift register and consecutively selecting each Y conductor by shifting a one bit in the horizontal shift register until it reaches the last position in the horizontal register. The horizontal shift register then is reset to an all zero condition and the next row is selected by shifting the one bit in the vertical shift register one position. By iterating the selection of consecutive Y conductors until a row has been scanned and iterating the selection of consecutive X conductors, the entire matrix will be scanned.

The measured skin conductance of an individual will vary from time to time depending upon factors such as the salinity, acid content, cleanliness, oil, contaminant, etc. on and of the skin. In order to compensate for this factor and to obtain the same values each time that identification measurements are carried out, the measurements obtained at a given time are adjusted or normalized with respect to the average skin conductance of all points measured at the same or substantially the same time.

In order to obtain an average value of conductance, a prescan operation is carried out. In this respect, the output of gates 42 is applied by way of comparison circuitry 44 to an averaging system 45. The output of gates 42 comprises a train of pulses of varying amplitude. These pulses are integrated by system 45 which produces and holds a voltage representative of the average conductance value of all of the points measured. This value then is applied to comparison circuitry 44 and the matrix is scanned a second time. During the second scan, the output of the comparison circuitry comprises pulses having amplitudes which are proportional to the ratio of the local skin conductance to the voltage out of the holding circuit 45, the latter of which indicates the average conductance value as obtained by prior scanning and integration.

Preferably, the output of the comparison circuitry 44 is digitized at 46 and applied to the memory of a general purpose digital computer.

Figure 7:
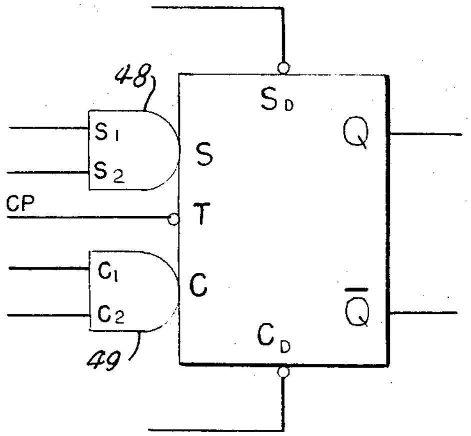
FIG. 7 is a block diagram of the circuit of FIG. 6.
Figure 6:
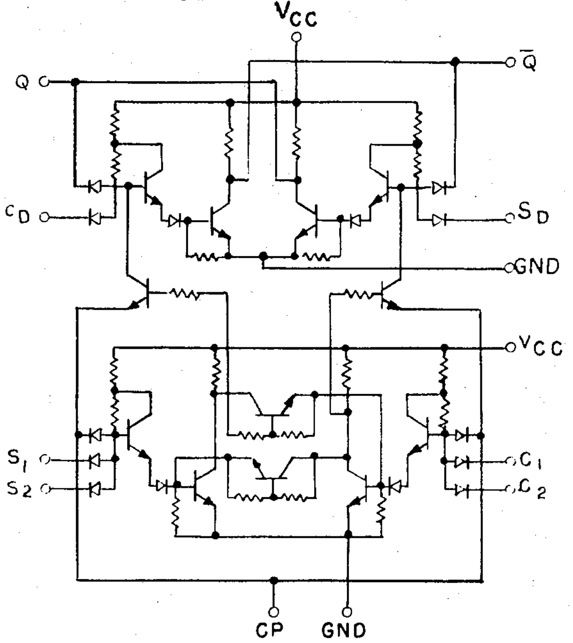
FIG. 6 is a schematic drawing of the circuitry of one type of flip-flop which may be employed in the logic and scanning system of the present invention.

There will now be described in more detail circuitry which may be employed in the system of the present invention. The logic control circuitry and the shift registers employed for carrying out the scanning and measurement operations, may be formed of commercially available logic elements. In one embodiment, these elements are integrated circuits of the diode-transistor logic family. One such element is the 831 clocked or synchronous flip-flop, or the equivalent thereof. A MC831 clocked flip-flop manufactured by Motorola is illustrated in FIG. 6 and in block diagram in FIG. 7. This clocked flip-flop consists of two directly coupled flip-flops, operating on the "master-slave" principle. Operation depends only on voltage levels. The input information is stored in the "master" flip-flop when the clock voltage is high, and is transferred to the "slave" when the clock voltage goes low.

Normal operating voltage for this flip-flop is +5 volts. It has two outputs Q and $\bar{Q}$. In the cleared or zero state, Q is low (zero volts) and $\bar{Q}$ is high (5 volts). The flip-flop has gating or enabling inputs $S_1$, $S_2$ and $C_1$, $C_2$ coupled through gates illustrated at 48 and 49 respectively in FIG. 7. It also has a toggle or clock pulse input CP, a direct set input $S_D$ and a clear direct input $C_D$. In the present system, input $S_D$ and input $C_2$ are not used. In addition, input $S_2$ in certain instances is not used. When a gate input is not used it must be high at all times. The following truth table is applicable.

SYNCHRONOUS TRUTH TABLE

| mode | $t_n$ | | | | $t_n+1$ |
|---|---|---|---|---|---|
| | $S_1$ | $S_2$ | $C_1$ | $C_2$ | Q |
| 1 | 0 | 0 | 0 | 1 | $Q_n$ |
| 2 | 0 | 1 | 0 | 1 | $Q_n$ |
| 3 | 1 | 0 | 0 | 1 | $Q_n$ |
| 4 | 1 | 1 | 0 | 1 | 1 |
| 5 | 0 | 0 | 1 | 1 | 0 |
| 6 | 0 | 1 | 1 | 1 | 0 |
| 7 | 1 | 0 | 1 | 1 | 0 |
| 8 | 1 | 1 | 1 | 1 | U |

Wherein:

| | |
|---|---|
| 0 | Low State (more negative) |
| 1 | High State (more positive) |
| $t_n$ | Present state |
| $t_n+1$ | Next state after clock |
| $Q_n$ | The state does not change |
| U | Undeterminate state |

By way of explanation consider mode 4 of the truth table and assume that the flip-flop is in the zero state. When the $S_1$ input is high and the $C_1$ input is low, the Q output will go high and the $\bar{Q}$ output will go low after a clock pulse is applied. The clock pulses employed are positive pulses. The ouputs of the flip-flop do not change states instantaneously (i.e. on the rise of the clock) but at a controlled time later which is on the fall of the clock pulse. Thus, when the clock pulse goes high, the outputs remain exactly as they were until the clock pulse goes low at which time, the outputs change states. This permits the outputs Q and/or $\bar{Q}$ to be used as controlling terms into $S_1$, $S_2$, $C_1$ or $C_2$ inputs without ambiguity.

A negative-going pulse applied to the $C_D$ input will override the enabling inputs and will clear the flip-flop immediately to place the flip-flop into its zero state. In this respect, the flip-flop will respond immediately to the negative-going transition of the input pulse applied to $C_D$ with insignificant delay.

Figure 8:
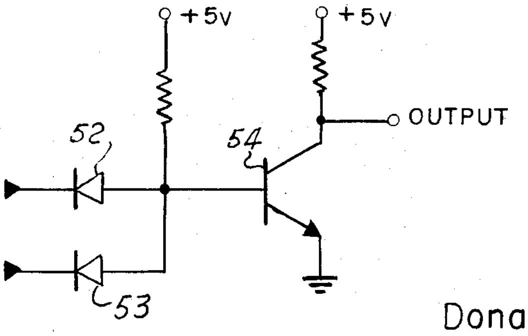
FIG. 8 is another type of logic element which may be employed in the logic and scanning system of the present invention.

FIG. 8 illustrates a NAND gate used in the present system. This gate comprises two input diodes 52 and 53 coupled to transistor 54. The output is taken from the collector of the transistor. In operation, two high or positive inputs to diodes 52 and 53 cause transistor 54 to conduct thereby resulting in a negative or low output. A high output will be obtained if the two inputs are low. A low input to one of the diodes, while the other input is high, will result in a positive or high output. Under these conditions, the gate may function or be employed as an OR gate. It is to be understood that more than two input diodes may be employed.

The gate of FIG. 8 also may be employed as an OR gate by disconnecting one of the diodes and applying an input to the other diode. A low input will result in a high output while a high input will result in a low output.

Figure 9:
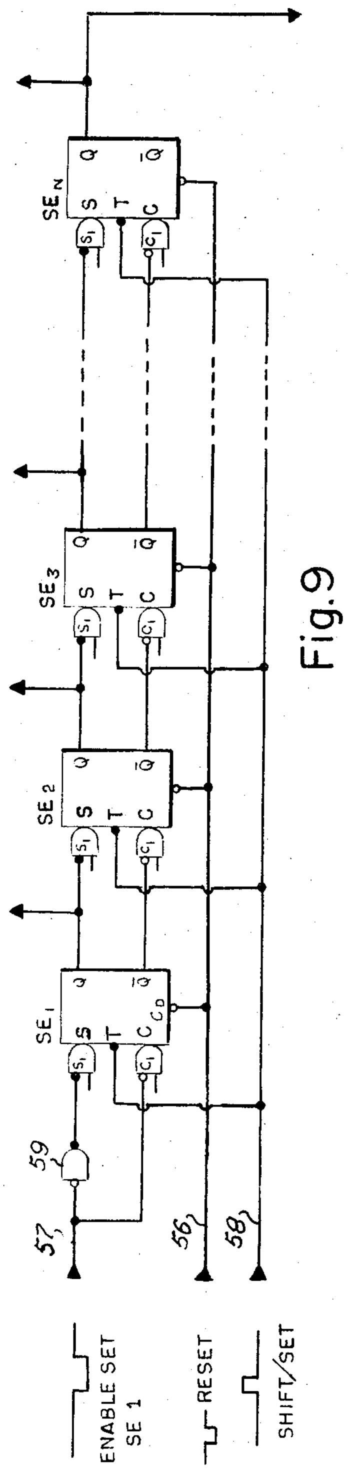
FIG. 9 illustrates in block diagram a shift register which may be employed in the logic and scanning system of the present invention.

Referring now to FIG. 9, there will be described a shift register which may be employed as the vertical or horizontal shift register 40 or 41. The shift register of FIG. 9 comprises a plurality of shift elements $SE_1$–$SE_N$ each comprising a clocked flip-flop of the type mentioned above. Except for the last shift element or flip-flop, the Q and $\bar{Q}$ outputs of each flip-flop are coupled to the $S_1$ and $C_1$ inputs respectively of the next flip-flop. The Q output of each flip-flop also is associated with one of the Y conductors or X conductors of the scanning matrix depending upon whether the register is a horizontal shift register or a vertical shift register. In operation of the shift register of FIG. 9, a negative reset pulse first is applied to conductor 56 to reset all of the flip-flops to their zero state whereby Q is low and $\bar{Q}$ is high. Negative is defined as ground. A one bit is placed in shift element $SE_1$ by applying a negative voltage or pulse to conductor 57 and simultaneously applying a positive clock pulse to conductor 58. The voltage applied to conductor 57 is inverted at 59 whereby the fourth mode of the truth table is applicable. In this respect, the clock pulse will cause shift element $SE_1$ to change states whereby Q goes high and $\bar{Q}$ goes low. Prior to the next clock pulse the voltage on conductor 57 goes high whereby the $S_1$ and $C_1$ inputs to shift element $SE_1$ are low and high respectively. The sixth mode of the truth table now is applicable. The next clock pulse resets shift element $SE_1$ to the zero state and causes shift element $SE_2$ to be placed in the one state thereby shifting the one bit to $SE_2$. As mentioned previously, since the clocked flip-flops do not change states on the rise of the clock but rather on its fall, shift element $SE_2$ is allowed to change states before $SE_1$ is reset to zero. At the time of the third clock pulse, the $S_1$ and $C_1$ inputs to $SE_2$ are low and high respectively while the $S_1$ and $C_1$ inputs to $SE_3$ are high and low respectively. Thus the third clock pulse causes $SE_3$ to be changed to the one state, thereby shifting the one bit to $SE_3$. The third clock pulse also resets $SE_2$. Since $SE_1$ is in the zero state, the third clock pulse does not affect this flip-flop. In this manner the one bit is shifted from shift element to shift element by each clock pulse.

Figure 10:
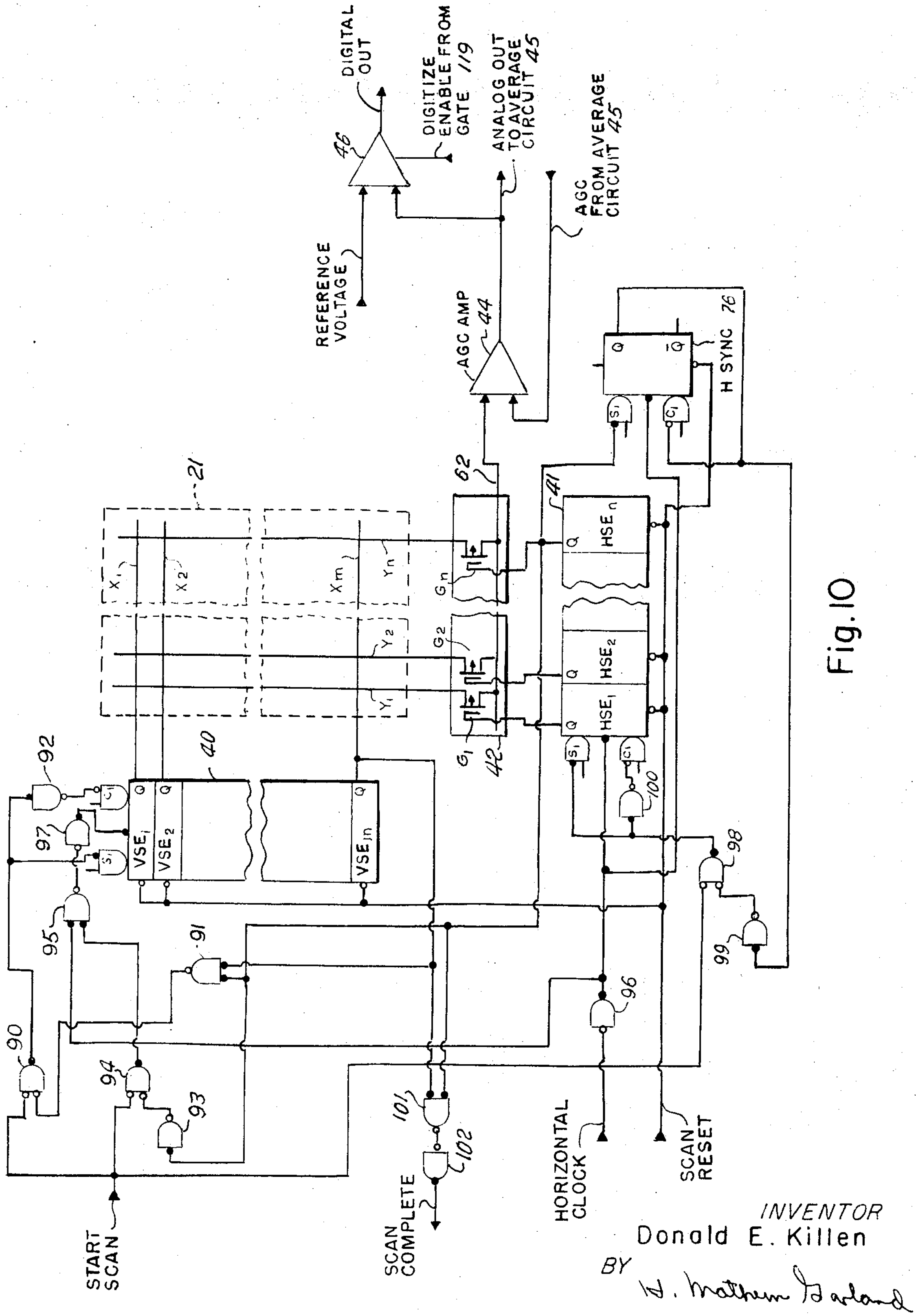
FIG. 10 illustrates in block diagram the scanning system coupled to the scanning matrix.

Referring now to FIG. 10, it can be seen that each shift element $VSE_1$–$VSE_m$ of the vertical shift register has its Q output coupled to one of the X conductors, $X_1$–$X_m$. In addition each shift element $HSE_1$–$HSE_n$ of the horizontal shift register has its Q output associated with one of the Y conductors $Y_1$–$Y_n$ by way of the gating system 42. This system in one embodiment may comprise a plurality of gates $G_1$–$G_n$ which may be field effect transistors, each having its source connected to a Y conductor, its gate connected to the Q output of one of the horizontal shift elements and its drain connected to common conductor 62. Each field effect transistor normally is non-conductive and is rendered conductive when a high input is applied to its gate. Thus, as a one bit is propagated down the horizontal shift register 41 and the Q outputs of each shift element HSE goes high, each field effect transistor sequentially is rendered conductive to pass current flow from conductors $Y_1$–$Y_n$ sequentially to common conductor 62 for measuring purposes. As can be seen in FIG. 10, each X conductor has one end connected to the vertical shift register 40 while the other end is left open. Similarly, each Y conductor has one end coupled to the gating system 42 while its other end is left open.

Figure 11:
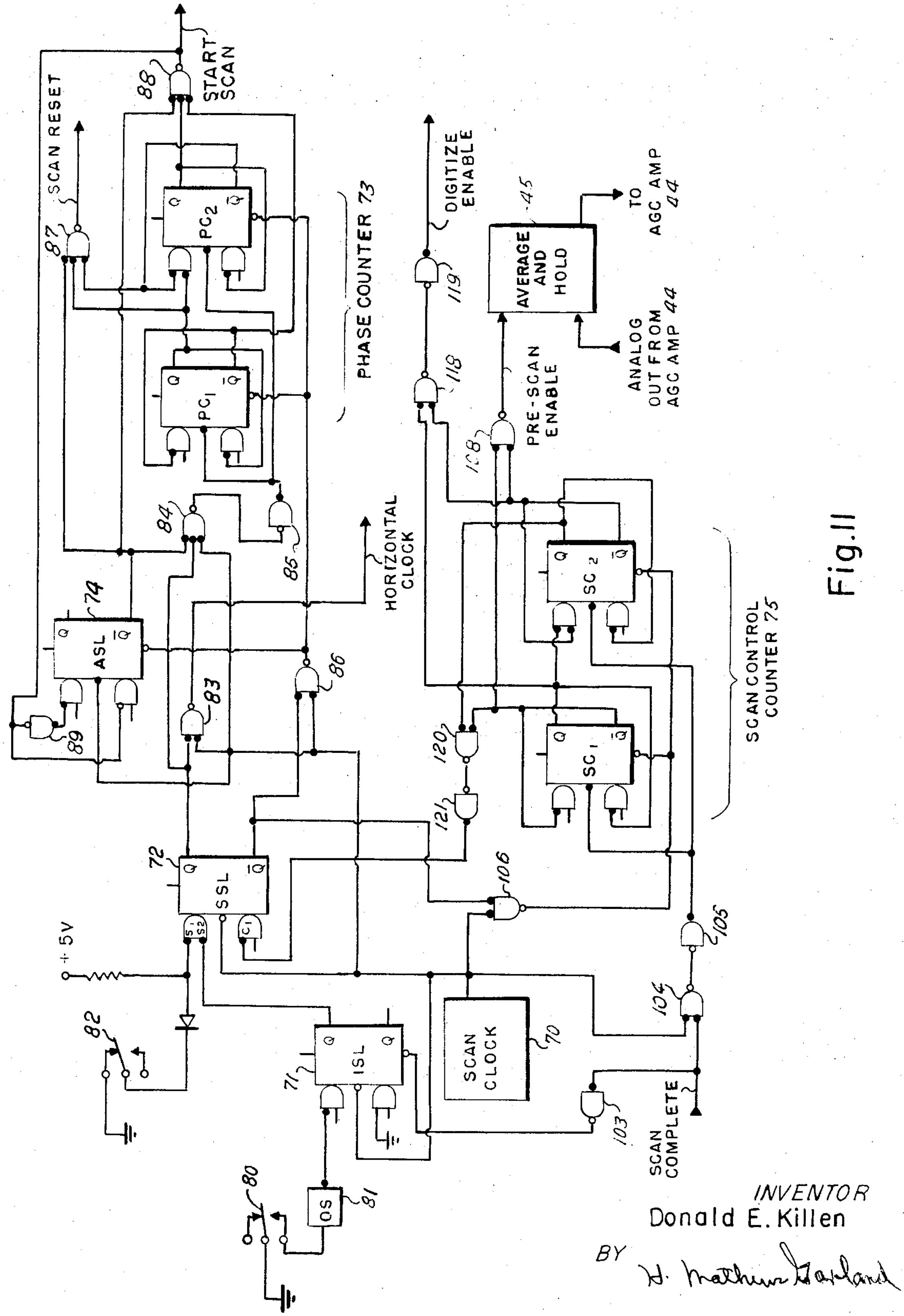
FIG. 11 illustrates in block diagram the scan control logic for controlling the system of FIG. 10.

Referring to FIG. 11, the logic system comprises a Scan Clock 70, an Initiate Scan Latch 71, a Scan Status Latch 72, a Phase Counter 73, an Active Scan Latch 74, a Scan Control Counter 75, and a plurality of OR and NAND gates. A horizontal synchronizing system 76 (FIG. 10) also is employed. Systems 71–76 comprise clocked flip-flops as disclosed above with certain input variations. Clock 70 is a high frequency oscillator producing high frequency clock pulses for example at a frequency of 1 megahertz. At this rate, pre-scan and scan operations will take place within a short period of time, for example, within one or two hundred milliseconds.

Figures 12, 12A, 12B, 12C, 12D, 12E, 12F, 12G, 12H, 12J, 12K, 12L, 12M:
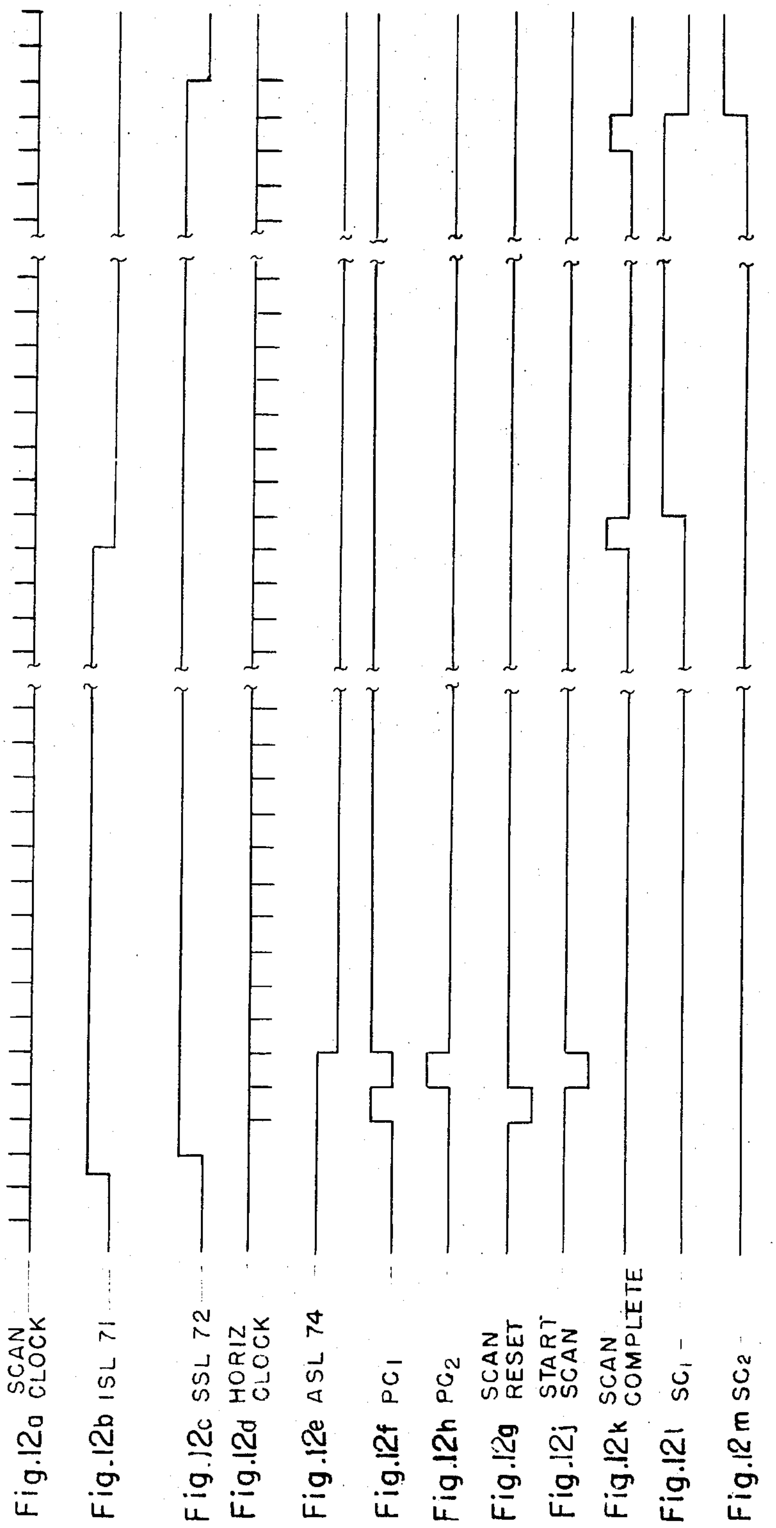
FIG. 12 is a timing diagram useful in understanding the present invention.

In the following description, it will be assumed that the flip-flops of system 71–76 are in their zero states whereby their Q outputs are low. In addition, the Scan Clock 70 is assumed to be running continuously for the production of clock pulses illustrated in FIG. 12*a*. Push button switch 80 then is actuated by the operator to trigger a one shot multi-vibrator 81. In one example, this multi-vibrator may produce pulses with a minimum spacing of one second, each pulse being positive going and having a duration of about 1 millisecond. Each pulse is applied to the ISL flip-flop 71 and the next clock pulse after the closure of switch 80, causes this flip-flop to change states whereby its Q output is high until ISL 71 is reset. The Q output of ISL 71 is illustrated in FIG. 12*b*, and is applied to the $S_2$ input of SSL flip-flop 72. The scan matrix 21 is physically located on the top of a push button switch illustrated in FIGS. 11 and 2 at 82. Thus, the individual whose finger is being scanned will place his finger on the matrix 21 and push down, thereby opening switch 82. This causes a high input to be applied to the $S_1$ input of SSL flip-flop 72 while its $S_2$ input is also high. The $C_1$ input of SSL 72 is low at this time as will become apparent from the following description. The next clock pulse thus causes the SSL flip-flop 72 to change to its one state whereby its Q output is high. FIG. 12C illustrates the Q output of SSL 72. This output is applied to enable NAND gate 83 which gates the clock pulses to the horizontal shift register 41 during the time that the Q output of SSL 72 is high. The output of gate 83 is illustrated in FIG. 12d.

As long as the ASL flip-flop 74 is in its zero state, its Q output, illustrated in FIG. 12*e*, is high. This output together with the Q output from SSL 72 is applied to NAND gate 84 to gate or pass the clock pulses to the clock pulse inputs of flip-flops $PC_1$ and $PC_2$ which form a two state binary counter termed the Phase Counter. The negative output pulses of gate 84 are inverted by OR gate 85 before application to $PC_1$ and $PC_2$. NAND gate 86 is employed to enable flip-flops $PC_1$ and $PC_2$ of Phase Counter 73 as well as ASL 74 to be reset to the zero state by the clock pulses when SSL 72 is initially in the zero state and subsequently when it is reset to the zero state from the one state.

The phase counter 73 provides two pulses, a scan reset pulse and a start scan pulse, illustrated in FIGS. 12*g* and 12*j*, respectively. The scan reset pulse is employed to reset all flip-flops in the vertical and horizontal shift registers to the zero state while the start scan pulse is employed to enable the first flip-flop of both shift registers to be set. As can be seen in FIG. 11, the Q output of the $PC_1$ flip-flop is coupled to its $C_1$ input while its $\bar{Q}$ output is coupled to its $S_1$ input. This connection provides for counting modulo two. In addition the Q output of $PC_1$ is coupled to NAND gate 87 and to the $S_2$ input of the $PC_2$ flip-flop. The $\bar{Q}$ output of $PC_1$ also is coupled to NAND gate 88. In addition, the Q output of $PC_2$ is coupled to its $C_1$ input and to NAND gate 88. The $\bar{Q}$ output of $PC_2$ is coupled to NAND gate 87 and to the $S_1$ input of $PC_2$. The $\bar{Q}$ output of ASL 74 also is coupled to NAND gates 88 and 87 to enable the start scan and scan reset pulses.

With this arrangement, the first clock pulse after the Q output of SSL 72 goes high, sets $PC_1$ to the one state which causes the output of NAND gate 87 to go low to produce the scan reset pulse. FIG. 12*f* shows the Q output of $PC_1$ while FIG. 12*g* shows the scan reset output of NAND gate 87. The next clock pulse advances the Phase Counter 73 by clearing $PC_1$ and setting $PC_2$ to the one state. This causes the scan reset output of gate 87 to go high and the start scan output of gate 88 to go low. FIG. 12*h* illustrates the Q output of $PC_2$ while FIG. 12*j* illustrates the output of gate 88. The third clock pulse after the SSL 72 output goes high, sets $PC_1$ and clears $PC_2$. Before $PC_2$ is cleared, however, the negative start scan output from gate 88 enables ASL 74 to be set. In this respect it is applied to the $C_1$ input of ASL 74 and inverted by OR gate 89 and applied to the $S_1$ input of ASL 74. Thus the third clock pulse also sets ASL 74 whereby its $\bar{Q}$ output goes low thereby blocking the passage of further clock pulses through gate 84.

Referring to FIG. 10, the negative start scan pulse is applied by way of NAND gate 90 and OR gate 92 to inhibit the $C_1$ input of $VSE_1$ and is applied to enable the $S_1$ input thereof. In this respect gate 90 normally has a positive potential applied thereto from NAND gate 91 whose inputs extend from the Q output of $HSE_n$ and from the Q output of $VSE_m$. Thus gate 90 functions as an OR gate and the negative start scan pulse results in a positive pulse from the output of gate 90 which is inverted by OR gate 92.

In addition, the start scan pulse is applied to NAND gate 94. Gate 94 functions as an OR gate, since it has a positive potential normally applied to its other input, this potential being obtained from inverting OR gate 93. The positive output of gate 94 is then applied to NAND gate 95 whereby the next inverted horizontal clock pulse from OR gate 96 is gated through gate 95 and inverted again by OR gate 97 to place flip-flop $VSE_1$ in its one state. The Q output of $HSE_n$ is gated through gates 91, 90, and 92 to enable $VSE_1$ to be set, as indicated above.

The negative start scan pulse also is applied to NAND gate 98. This gate has a positive potential normally applied thereto from OR gate 99 whose input extends from the Q output of flip-flop 76. Thus, gate 98 functions as an OR gate. The start scan pulse thus is gated through gate 98, applied to the $S_1$ input of $HSE_1$ and inverted at 100 and applied to the $C_1$ input of $HSE_1$. The inverted horizontal clock pulse, from gate 96, which sets $VSE_1$ is employed to set $HSE_1$ to the one state also at this time. When the output of gate 88 (FIG. 11) goes positive, the $S_1$ and $C_1$ inputs to $HSE_1$ go low and high, respectively, thus enabling the next clock pulse from gate 96 to clear $HSE_1$ and to set $HSE_2$ thereby shifting the one bit in the horizontal shift register 41. Prior to the time that the one bit is shifted to $HSE_n$, the output of gate 97 is negative, thus preventing the vertical shift register 40 from being shifted while the horizontal scan is taking place.

The scanning process consists basically of propagating or shifting a one bit down the horizontal shift register 41 until it reaches the last element $HSE_n$ and then looping it around through the HSYNC flip-flop 76 to place a one bit in $HSE_1$ again. The one bit, as it is shifted down the horizontal shift register 41, selects and enables the gates $G_1$–$G_n$ which allows conduction paths through the matrix contact pairs and into the comparator circuit 44 which in one embodiment may be an AGC amplifier.

As can be seen in FIG. 10, the Q output of $HSE_n$ is coupled to the $S_1$ input of the HSYNC flip-flop 76. Its Q output also is coupled to its $C_1$ input. After the one bit has propagated into $HSE_n$, the next clock pulse changes the HSYNC flip-flop 76 to the one state and clears $HSE_n$ to the zero state. The next horizontal clock pulse after this clears the HSYNC flip-flop 76 to the zero state. The purpose of the HSYNC flip-flop 76 is to allow one bit time during which nothing is scanned (all horizontal shift elements are in zero state), and during which time the one bit in the vertical shift register is propagated downward to select the next line in the sequence.

During the one bit time that $HSE_n$ is in a one state, the Q output thereof is routed through gates 93 and 94, and is gated with the Horizontal Clock through gate 95 and inverted again in gate 97 to provide a vertical clock pulse. At this time, since $VSE_m$ is in the zero state, a low input to gate 91 produces a high input to gate 90; the other input to gate 90 is high; therefore its output is low inhibiting $S_1$ of $VSE_1$ and enabling $VSE_1$ to be cleared. The vertical clock pulse thus clears $VSE_1$ and shifts the vertical shift register one position at the end of the bit period in which $HSE_n$ is in the one-state, or the next row is enabled for scanning. Each time this occurs a new line is selected. When HSYNC is set to the one state, the $S_1$ and $C_1$ inputs to $HSE_1$ go high and low, respectively, thereby enabling the next horizontal clock pulse to set $HSE_1$. Thus, the new line is then scanned horizontally, as was the previous one.

This process continues, until, when the contact pair of the last row is selected, the scan of the entire matrix is completed. At this time there will be a one bit in $VSE_m$ and in $HSE_n$. In the event that $m$=144 and $n$=72, the system will have scanned 72×144=10,368 matrix points and produced an output for each one clock period in duration and of an amplitude proportional to the conductivity of the skin.

When $VSE_m$ and $HSE_n$ are in the one state, their Q outputs will both be high. These outputs are gated through NAND gate 101 and inverting OR gate 102 to produce a positive pulse, scan complete, which is used in the scan control circuitry to either switch from pre-scan or to terminate the operation.

The scan complete signal is illustrated in FIG. 12*k*. The scan control logic of FIG. 11 receives the scan complete signal and inverts it in OR gate 103, then applies it to directly reset ISL71 to the zero state. The Q output of ISL71 then goes low. The scan complete signal also is applied to NAND gate 104 to gate the next clock pulse. The resulting single negative clock output from gate 104 is inverted at OR gate 105 and applied to advance the Scan Control Counter 75 which is a two stage binary counter comprising flip-flops $SC_1$ and $SC_2$. Their Q outputs are illustrated in FIGS. 12*l* and 12*m* respectively. Both $SC_1$ and $SC_2$ were reset by the Scan Clock while SSL72 was in the zero state prior to the beginning of the scan. In this respect, the $\bar{Q}$ output of SSL72, when positive, allows the Scan Clock output to pass through NAND gate 106 for resetting purposes.

Figure 13:
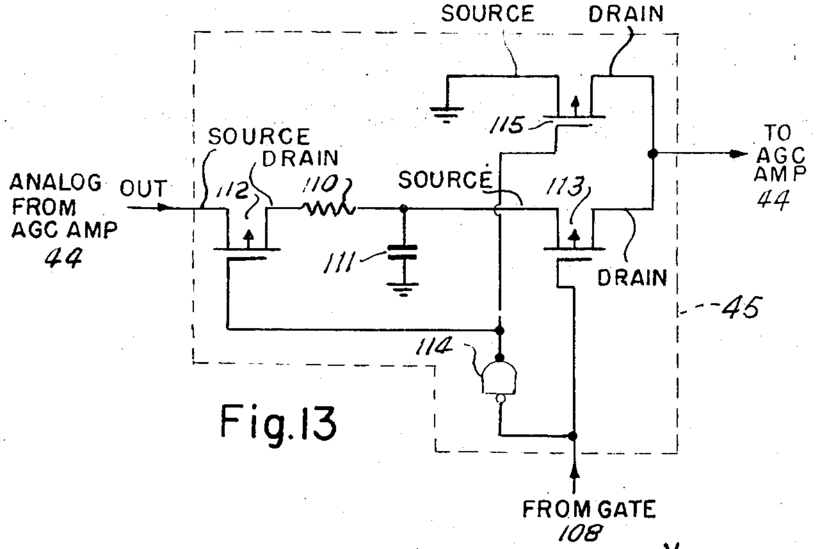
FIG. 13 illustrates in more detail one type of average and hold system which may be employed in the present invention.

Prior to the receipt of the first scan complete pulse, both $SC_1$ and $SC_2$ thus are in the zero state whereby their $\bar{Q}$ outputs are high. This pre-scan condition is decoded by NAND gate 108 and used to enable the average and hold circuit 45 which integrates the analog output signal from the AGC amplifier 44. Referring to FIG. 13, one type of average and hold circuit comprises resistor 110 and capacitor 111 which forms an integrator. Also included are field effect transistors 112 and 113. The negative pre-scan output from gate 108 opens field effect transistor 113 (renders it non-conductive) and is inverted by OR gate 114 to close (renders it conductive) field effect transistor 112. This allows the analog output from AGC amplifier 44 to pass to the integrator where the analog output is integrated or averaged during pre-scan and held during the scan cycle. The analog output from AGC amplifier 44 comprises pulses whose height indicate local skin conductivity values as indicated above. Referring again to FIG. 13, during pre-scan, the positive output from OR gate 114 also is applied to close field effect transistor 115 whereby the AGC input is held at a nominally low (ie. ground) level to allow maximum gain for the AGC amplifier 44. In this respect, the output $E_o$ of AGC amplifier 44 may be expressed as follows:

$$E_o = K \cdot (E_{in})/(AGC)$$

The average value obtained by the integrator is used to adjust the effective gain of the AGC amplifier 44 during the scan cycle which follows and, during which digitized data is fed to the external system.

Referring again to FIG. 11, once the pre-scan cycle is complete, the scan complete pulse and a clock pulse are employed as indicated above to advance the Scan Control Counter 75 whereby $SC_1$ is set to the one state. Flip-flop $SC_2$ is still reset to the zero state. This condition is decoded by NAND gate 118 whose output is inverted by OR gate 119 for the production of a positive Digitize Enable Signal. This signal is applied to enable or actuate the digitizing circuit 46 which compares a reference voltage to the output of AGC amplifier 44. During scan, the output of AGC amplifier 44 comprises pulses having amplitudes which indicate the local skin conductivity. During the scan cycle, the AGC input to the AGC amplifier 44 adjusts the gain downward to a level dependent upon the average skin conductivity as measured. This is done to minimize or reduce the effect of salinity, greasiness, etc. of the finger as well as the effect of noise due, for example, to current leakage whereby the presence or absence of a papillary ridge may be detected more accurately.

Referring to FIG. 13, during the scan cycle, the input to field effect transistor 113 and to inverting OR gate 114 goes high. Thus, field effect transistors 112 and 115 are opened while field effect transistor 113 is closed. This prevents further input to the integrator and allows its output to pass by way of field effect transistor 113 to control the gain of AGC amplifier 44. Since the AGC input to amplifier 44 now is higher than during prescan, its gain is adjusted downward as can be understood from the relationships discussed above. It is to be understood that modifications could be employed to adjust the gain of AGC amplifier 44 up or down during scan, if desired, to remove the average or background effects.

During the scan cycle, the entire initializing procedure of the pre-scan cycle is repeated except that the scan reset signal is not needed and the start scan signal is generated internally as can be understood from the following referring to FIG. 10. At scan complete time, the Q output of $HSE_n$ is gated through gates 93, 94, 95, and 97 to enable the next horizontal clock to provide a vertical clock pulse to set $VSE_1$ to the one state. This action is enabled by the Q output of $HSE_n$ which is gated with the Q output of $VSE_m$ in NAND gate 91, passed by gate 90, and inverted by gate 92, to provide a low input to the $C_1$ and a high input to the $S_1$ input of $VSE_1$. The first horizontal clock pulse following the one which sets HSYNC 76 to its one state will set $HSE_1$ to the one state. In this respect the Q output of HSYNC 76, when it is high, is gated through gates 99 and 98 to allow the next horizontal clock to set $HSE_1$. This combination causes $HSE_1$ and $VSE_1$ to be set to the one state while all other flip-flops in the registers are cleared. Thus the scanning system is conditioned to begin the scan cycle, which proceeds as before, until a second scan complete pulse is generated. This second scan complete pulse again advances the scan control counter 75 by clearing $SC_1$ and setting $SC_2$ to the one state. This condition is decoded by NAND gate 120 and inverted by OR gate 121 thereby enabling the next clock pulse to clear the SSL 75 flip-flop. Even if switch 82 is still open at this time, the Q output of ISL 71 will be low, providing a low or disabling input to the $S_2$ input of SSL 72. This ends the scan cycle and when SSL 72 is reset to zero, the Phase Counter 73, the Scan Control Counter 75, and the ASL flip-flop 74 are cleared by the next clock pulse. The ISL flip-flop 71 was cleared by the first scan complete pulse while the shift registers and the HSYNC flip-flop 76 were cleared when they were cycled through at the end of the scan cycle.

In one embodiment, the digitizing circuit 46 may be of the type which produces a one-bit binary output, either high or low depending upon the amplitude of the pulses applied from the AGC amplifier 44. One such circuit is a Fairchild 710 comparator which compares the input to a reference voltage and if the difference between the input and the reference voltage is greater than or equal to a certain small value than the output is high. If the difference is less than a certain small value then the output will be low. The reference voltage may be adjusted to a desired level.

Figure 14:
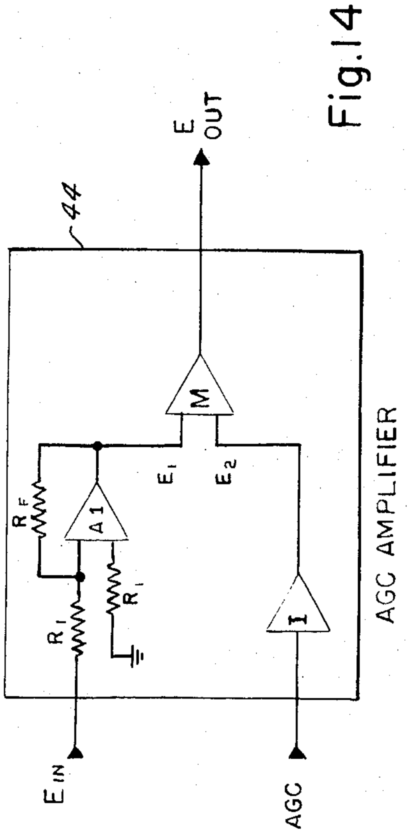
FIG. 14 illustrates one type of AGC amplifier which may be employed in the system of the present invention.

The AGC amplifier in one embodiment consists of three basic elements, as illustrated in FIG. 14. These are non-inverting operational amplifier A1, inverting amplifier I, and voltage multiplier M. Assuming a high open-loop gain, the closed-loop voltage gain of A1 is determined by the ratio $R_f/R_1$. Thus, E1, one of the inputs to M, is defined by : $E1=E_{in}\cdot R_f/R_1$. The inverter, I, serves to produce an output which is maximum in amplitude with zero input, and which is the direct inverse of the input. Therefore, the other input E1 to the multiplier M, is defined by $E_2=1.0/AGC$ where $AGC \neq 0$. The multiplier M is an ordinary d.c. voltage multiplier. Thus, $E_{out}=E_1\cdot E_2$. The summary equation for the AGC amplifier is, therefore, $$E_{out}=(E_{in}\cdot R_f)/(R_1\cdot AGC) = K\cdot[(E_{in})/(AGC)]$$

This circuit functions thus to divide the individual skin conductivity, as indicated by current flow into a node which produces $E_{in}$, by the value of conductivity integrated over all measured (pre-scan) points.

The pre-scan cycle with integration of scanned values and the automatic gain control system thus provide an arrangement and technique for reducing or minimizing the effect of variations in average conductivity of various fingers (due to chemical and other variables) upon the scanned representation of a fingerprint. Also reduced are the effect of the possible presence of leakage paths for electrical current flow between the X and Y conductor areas and substrate or other conductors therein. In addition to leakage paths within the scanning matrix, surface contamination may provide additional minor leakages the effect of which will be reduced. The AGC system provides the capability for forming an electrical ratio. The pre-scan cycle provides time during which the integral of all scanned conductance values is formed. This integral, $$E_{ps}=\frac{K}{m\cdot n}\int_{X_1}^{X_m}\int_{Y_1}^{Y_n} G_{x,y}\,dxdy,$$

is approximated by summation methods, e.g.

$$E_{ps}=\frac{K}{m\cdot n}\sum_{x=1,\,y=1}^{m,n} G_{x,y}$$

Where:

$E_{ps}$ is a voltage representing average conductance;

K is a constant; and $G_{x,y}$ is the conductance value at a selected matrix point, represented during pre-scan, by the height of a pulse out of the AGC amplifier while its AGC input is held at zero or nominal level.

During the duration of the main scan cycle, the integrated voltage derived above, is applied to the AGC input of the AGC amplifier. The subsequent pulses out of the AGC amplifier will be of an amplitude representing the ratio of the input (local skin conductivity) to the integrated, or average value $E_{ps}$. During scan, the pulse amplitude $E_s$ may be expressed as:

$$E_s = E_L/E_{ps}$$

where $E_L$ is a voltage which represents the local skin conductivity, or since $E_{ps}$ is applied to the AGC input, $$E_s = E_L/AGC$$

Consider a finger having low conductivity caused by chemical factors such as oil or grease on the skin. The output pulses from the scanning matrix generally will be relatively low. The heights of these pulses may be below the threshold (reference voltage) of the digitizer. Without pre-scan and the AGC systems, thus many points on the skin, where contact is made with the contacts of the matrix, will be missed or undetected.

The pre-scan and AGC systems, however, will increase the sensitivity to the detection of the presence or absence of a papillary ridge. A low conductivity finger will produce relatively low amplitude pulses out of the AGC amplifier during pre-scan. For this case, $E_{ps}$ will be a relatively low amplitude input to the AGC amplifier during the scan cycle. Thus the local conductance values during scan will be divided by some low (e.g. unity or less) value and the AGC amplifier output will be adjusted thus to be a relatively high value. Thus, the pulse heights applied to the digitizer will be adjusted by the AGC amplifier whereby the presence or absence of a papillary ridge at a local point may be more accurately detected by the digitizer.

Thus the ratio of local to average conductivity will be normalized and will, when unity, represent one-half of the maximum output possible (input to the digitizer). In the case of a papillary ridge in contact with the scanner, the measured conductance will be higher than average, and the ratio $E_s/E_{ps}$ is greater than unity. This will be digitized as a higher than average value. In the case of a one-bit digitizer, average will be the threshold between a 1 and a 0. Above average conductance will be digitized as a 1 while below average values will be digitized as a 0.

It is to be noted that during pre-scan, the total number of matrix points in contact with the skin is always less than the total number of matrix points, and is estimated to be about 50 percent of the total. Thus, the integrated conductance value, represented by $E_{ps}$ will be about half the amplitude of a pulse representing the conductance value measured by a matrix contact pair entirely contacting skin. The scanning matrix 21 is a solid state device formed in a module or chip and having its conductors and contact pairs formed by microcircuit or integrated circuit techniques employing for example photoetching, metallic deposition and diffusion techniques. Although not necessary, it is desirable to have the vertical shift register 40, the horizontal shift register 41, and the gating system 42 formed intrinsic with the solid state chip. This is also true with respect to the AGC amplifier 44 and the average and hold circuit 45.

Referring now to FIGS. 15–30, there will described one manner or process in which the scanner matrix 21 may be formed. In one embodiment a P-type silicon chip 130 of suitable size is employed. This chip and the resulting structure or material formed thereon or diffused therein, in the process, are illustrated in cross-section in FIGS. 15–27 and 19–32.

Figures 15, 16, 17, 18, 19, 20, 21, 22, 23:
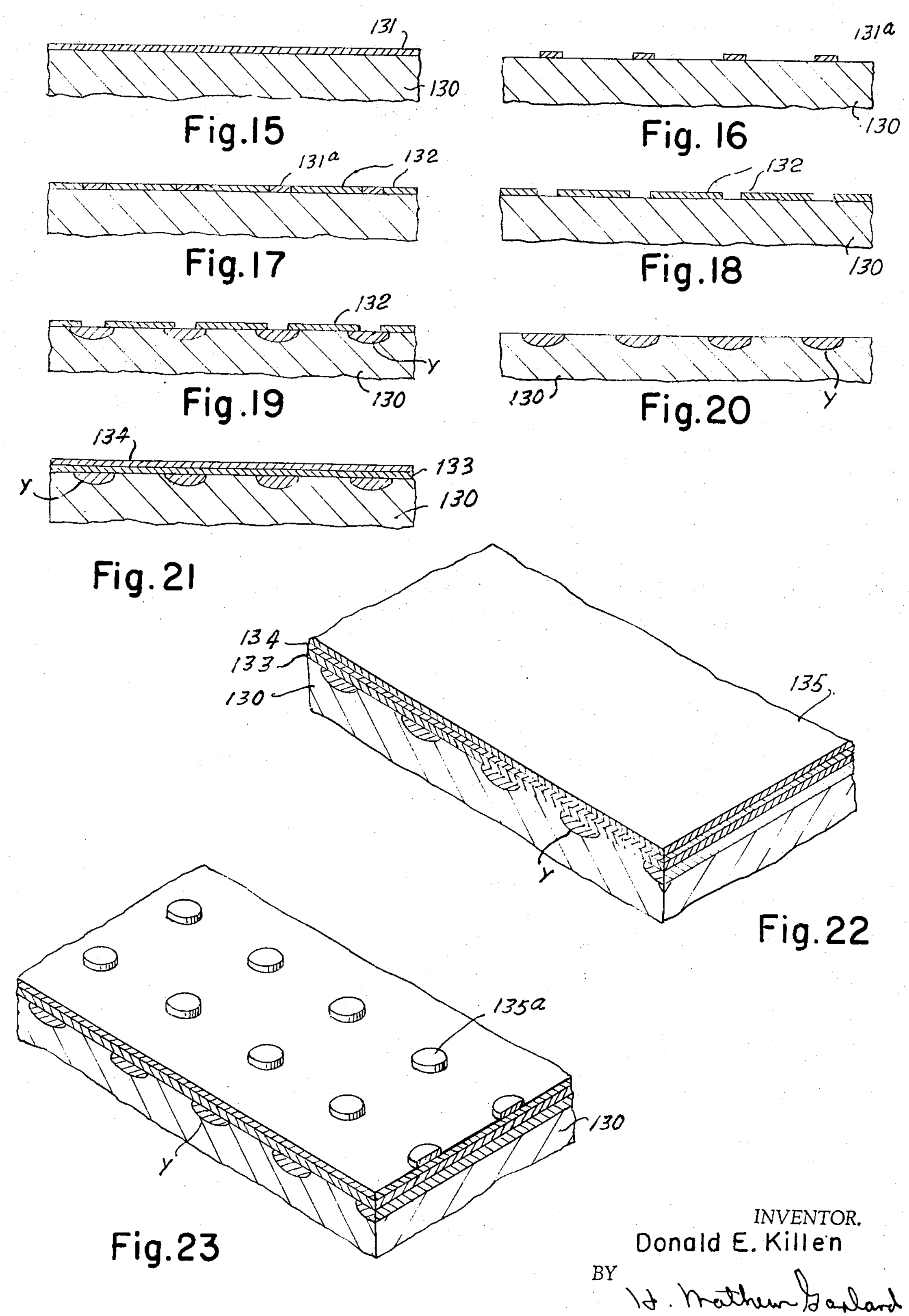
FIGS. 15-32 illustrate one technique for forming the scanning matrix of FIGS. 3-5.

Initially, the Y-conductors may be formed on the chip 130. This may be done by depositing on the chip a material 131 which is photosensitive and which dissolves in a solvent depending upon whether the solvent is or is not exposed to light. The material may be selectively exposed to light by means of a mask having transparent parallel lines, the image of which is focused on the surface of the photosensitive material. The mask may be formed by drawing parallel lines on an enlarged sheet and exposing these lines to an enlarged photographic material or plate whereby an enlarged transparency may be obtained which is opaque except for the parallel lines. This transparency then may be reduced in size to correspond with the size of the silicon chip 130. After the material 131 is exposed to the reduced mask image, the exposed portion is dissolved with a solvent, leaving parallel strips 131*a* of the material on the top surface of the chip 130 as illustrated in FIG. 16. Between these strips is grown or deposited SiO or $SiO_2$ illustrated at 132 in FIG. 17. Next, the strips 131a are removed by a suitable solvent to obtain the structure shown in FIG. 18. This structure thus will comprise parallel strips 132 of SiO or $SiO_2$ located on the surface of chip 130 and spaced from each other. By an impurity doping or diffusion process there is produced between these strips that form of silicon known as N++ type of material. This material thus forms the Y-conductors as illustrated in FIG. 19. It has a property of low resistivity and individual lines or conductors are electrically isolated from each other through two NP junctions formed back to back. Next the SiO or $SiO_2$ strips 132 are removed with hydroflouric acid or other suitable reagents to leave only the Y-conductors as shown in FIG. 20. Next, a layer of aluminum 133 is deposited over the surface. Over the aluminum is deposited a layer of rhodium 134 to form the struc-ture shown in FIG. 21. The layers of aluminum and rhodium may be deposited by vacuum depositing techniques. The two layers together may be, for example, of the order of 0.0005 to 0.0015 inch thick. Other suitable metals may be used instead.

Figure 24:
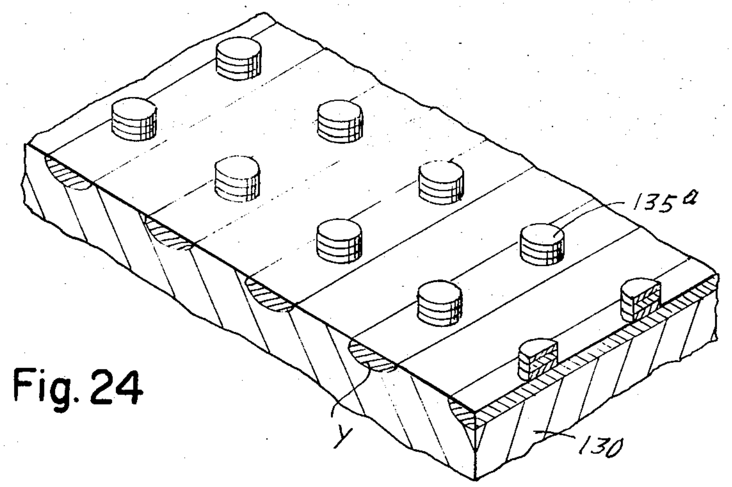

Next, the $Y_c$ contact members or dot patterns are formed. This is done by depositing over the rhodium layer a layer of photosensitive material 135 as shown in FIG. 22. A transparent mask is formed with opaque dot patterns located at positions corresponding to the desired positions of the $Y_c$ contact members. The image of this mask may be focused on the photosensitive material and the material exposed to light through the transparent portion. After exposure, the exposed material is removed with a solvent to form the pattern of dots 135*a* over the aluminum and rhodium layers as shown in FIG. 23. The rhodium and aluminum layers not under the dots 135a then are etched away leaving the dots extending from the Y-conductors as shown in FIG. 24. Each dot in FIG. 24 comprises a layer of aluminum, a layer of rhodium, and a layer of photosensitive material. The photosensitive material on each dot then is removed leaving the $Y_c$ contact members extending from the Y-conductors. Thus each $Y_c$ contact member comprises a layer of aluminum and a layer of rhodium.

Figure 25:
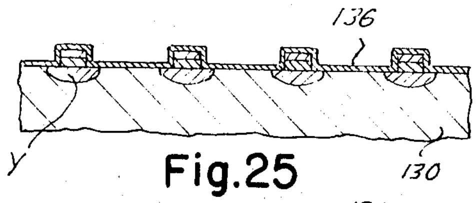
Figure 26:
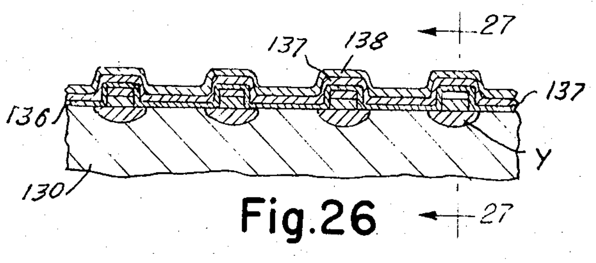

Next a layer 136 of SiO or $SiO_2$ may be vacuum deposited over this structure in such a way as to provide good insulation on the surface of the chip as well as over all of the $Y_c$ contact members as shown in FIG. 25. One method is vacuum deposition, in which the chip may be rotated angularly during deposition in order to deposit the SiO or $SiO_2$ on the sides of the $Y_c$ contact members as well as on the top thereof.

Figure 27:
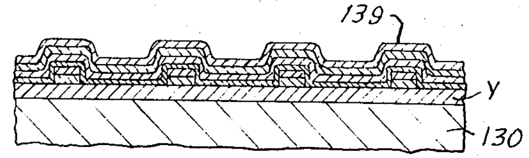

Next, a layer 137 of aluminum may be vacuum deposited over the insulation. A thicker layer 138 of corrosium and abrasion resistant metal, such as rhodium may be vacuum deposited over the aluminum to provide the structure shown in FIG. 26. Next, a layer of photosensitive material may be deposited over the rhodium layer 138. FIG. 27 is a cross-section taken through that of FIG. 26 in the plane indicated by the lines 27—27 and which also illustrates the layer of photosensitive material at 139.

Figure 28:
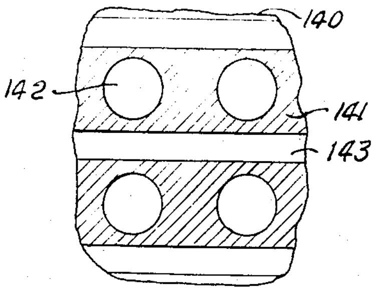
Figure 29:
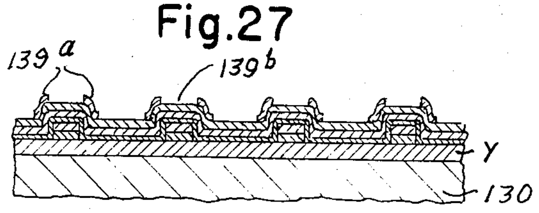
Figure 30:
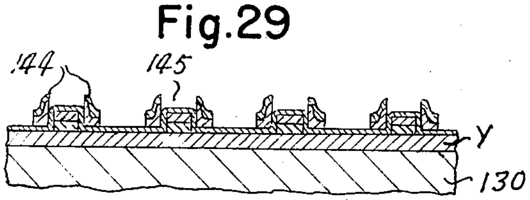
Figure 31:
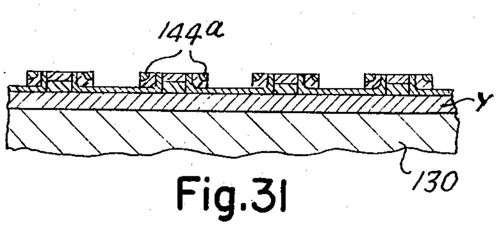
Figure 32:
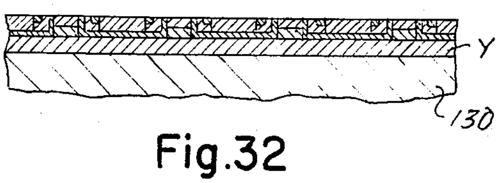

A mask 140 is formed as shown in FIG. 28. This mask comprises a plurality of spaced, opaque strips 141 having a plurality of transparent circles or dots 142 formed therein and corresponding with the positions of the $Y_c$ contact members. Between the opaque strips 141 are transparent strips 143. The image of this mask then is focused on the layer of photosensitive material at the appropriate position and the material under the transparent apertures 142 and under the transparent strips 143 is exposed to light. The mask then is removed and the exposed photosensitive material is dissolved to form a plurality of parallel strips of photosensitive material shown at 139a in FIG. 29 having a plurality of apertures 139*b* over the $Y_c$ contact members. FIG. 29 as well as FIGS. 30–32 illustrate cross-sections of the silicon chi in the same plane as that of FIG. chip The rhodium and aluminum between the strips 139*a* and within the apertures 139*b* then is removed by an etching process and the photosensitive strips are dissolved to form a plurality of strips of rhodium and aluminum shown at 144 in FIG. 30. Each strip 144 has a plurality of apertures 145 over the $Y_c$ contact members. The top of the strips 144 as well as the insulation 136 is lapped down to the level of the top of the contact members $Y_c$ to form the structure shown in FIG. 31. The lapped strips 144 thus form the X conductors with a plurality of holes $X_h$ formed therethrough. Extending through the holes are the $Y_c$ contact members surrounded by the insulation 136. Next SiO or $SiO_2$ is deposited over the structure of FIG. 31 to fill in the gaps between the X conductors. Next the assembly may be lapped or ground flat to the surface of the $Y_c$ contact members to form the structure shown in FIG. 32 which is a view similar to that of FIG. 4 but with more detail of the formation of the structure.

In the operation of the scanning matrix, the low voltage pulses (5 volts) of short duration applied to the conductors of the scanning matrix and the low current flow will prevent electrical shock or sensation to the individual whose finger is being scanned. In addition, the scanning matrix assembly will be supported in an insulated base 22 as indicated above. Prior to each operation the top surface of the matrix may be cleaned to insure accurate measurements.

Although scanning was described as being done row by row, it is to be understood that scanning could be accomplished column by column instead. In addition, a partial scan could be carried out instead of a complete scan.

Instead of employing the digitizing circuit 46 which produces a one bit binary output, other types of digitizing circuits may be employed. For example, in order to digitize the analog pulse heigth to 3-bit accuracy, any of several conventional analog-to-digital converter circuits may be used. One such circuit would employ eight comparator circuits (e.g. the Fairchild 910), each with a different reference level, but all with a common connection to the AGC amplifier output. The reference levels would be, for example, *a*, 2*a*, 3*a*, — 8*a*, where "*a*" represents some voltage amplitude to be compared with the pulses.

The output of the comparators would be encoded, for example, in an octal encoder, to provide a 3-bit binary output representative of the comparator with the highest input which was above the reference input thereto.

The general purpose digital computer for obtaining comparison of the incident image with the file image is controlled by suitable logic and programs. An incident image as mentioned above is accompanied by a code number or data word which is used to reference and access the master file image for that individual. The incident and file images are compared in the computer and when a significantly high degree of correlation is reached, a hit will be achieved. In other words the two images are alike or enough alike to merit the affirmation of identification by fingerprint comparison.

What is claimed is:

1. A matrix device for measuring an electrical property of the skin of a body member for identification purposes comprising:
   - a plurality of spaced sensing means located in a grid pattern forming rows and columns of sensing means,
   - said plurality of sensing means being located in a planar surface for engaging said skin for electrical resistance measuring purposes,
   - each sensing means comprising a pair of spaced first and second contacts electrically isolated from each other in the plane of said surface for sensing for said electrical property of the skin dependent at least in part upon the amount of contact of the skin with each pair of said contacts,
   - a first set of electrical conducting means located in rows and electrically isolated from each other,
   - each row of electrical conducting means of said first set electrically connecting together a row of said first contacts, and
   - a second set of electrical conducting means located in columns and electrically isolated from each other and from said electrical conducting means of said first set,
   - each column of electrical conducting means of said second set electrically connecting together a column of said second contacts.

2. A method of electrically scanning the surface pattern of a portion of the skin tissue of a body member of a human being such as a fingerprint to produce an electrical signal image of said pattern comprising:
   - sensing for an electrical parameter representative of a surface feature of said skin pattern at a plurality of different points on the surface of the skin of said body member;
   - producing electrical signals representative of said electrical parameters sensed between selected ones of said plurality of different points on said surface of said skin of said body member; and deriving an electrical signal image of said surface pattern of said skin from said electrical signals.

3. A method in accordance with claim 2 including the steps of:

obtaining an average value of said electrical parameters sensed between said selected ones of said plurality of different points, and thereafter comparing the value of said electrical parameter sensed at each of said selected ones of said plurality of different points with said average value prior to deriving said signal image.

4. A method in accordance with claim 2 including:

sensing for an electrical property between only adjacent points at each of a plurality of pairs of adjacent points on the surface of the skin of said body member.

5. A device for obtaining an electrical signal image of a skin point of a human being such as a fingerprint by measuring electrical parameters of the surface of said skin comprising:

a plurality of electrical sensing means closely spaced in a matrix to contact and distinguish between ridges and valleys of said skin pattern for obtaining a measure of an electrical parameter of said skin representative of said ridges and valleys between selected ones of a plurality of different points on the surface of said skin, and means for supporting said sensing means in a position to engage said skin for measuring purposes.

6. The device of claim 5 including means for sequentially and separately selecting different ones of said sensing means for sequentially and separately obtaining a measure of said electrical parameter between said selected ones of said plurality of different points on said skin of said body member.

7. A device in accordance with claim 6 including:

means for obtaining a measure of the average value of said electrical parameter at a plurality of different points on said skin of said body member under investigation, and means for comparing said average values with said measurements obtained at each of said sensing means.

8. A device in accordance with claim 5 including:

means for obtaining an average value of all of said electrical parameters sensed between said selected ones of said plurality of points on said skin of said body member under investigation, and means for comparing said average value with the value of each of said electrical parameters as sensed at each of said selected ones of said plurality of different points.

9. A device for detecting a skin surface pattern of a human being such as a fingerprint by measuring electrical parameters of said skin comprising:

a matrix of a plurality of closely spaced electrical sensing means for contacting and distinguishing between ridges and valleys of said skin pattern by obtaining a measure of an electrical parameter of said skin surface between a plurality of different points, each sensing means comprising a pair of spaced first and second contacts for contacting the surface of said skin, a first set of electrical conducting means, each conducting means of the first set electrically connecting together a plurality of different ones of said first contacts, a second set of electrical conducting means, each conducting means of said second set electrically connecting together a plurality of different ones of said second contacts, and means for supporting and positioning said first and second contacts of each sensing means in a sensing surface for engaging said surface of said skin for measuring purposes.

10. The device of claim 9 comprising:

means for sequentially and separately selecting different ones of said pairs of first and second contacts for obtaining a measure of said electrical parameter between a plurality of different points on said skin of said body member.

11. A device for measur-ing an electrical parameter of the skin of a body member comprising:

a plurality of spaced sensing means for obtaining a measure of an electrical parameter of said body member between a plurality of different points, each sensing means comprising a pair of spaced first and second contacts for contacting the surface of the skin of said body member, a first set of electrical conducting means, each conducting means of the first set electrically connecting together a plurality of different ones of said first contacts, a second set of electrical conducting means, each conducting means of said second set electrically connecting together a plurality of different ones of said second contacts, means for supporting and positioning said first and second contacts of each sensing means in a sensing surface for engaging said surface of said skin of said body member for measuring purposes, means for sequentially and separately selecting different ones of said pairs of first and second contacts for obtaining a measure of said electrical parameter between a plurality of different points on said skin of said body member, means for obtaining a measure of the average value of said electrical parameter at a plurality of different points on the skin of said body member under investigation, and means for comparing said average value to said measurements obtained as each of said pairs of first and second contacts are sequentially and separately selected.

12. A device for measuring an electrical parameter of the skin of a body member comprising:

a plurality of spaced sensing means for obtaining a measure of an electrical parameter of said body member between a plurality of different points, each sensing means comprising a pair of spaced first and second contacts for contacting the surface of the skin of said body member, a first set of electrical conducting means, each conducting means of the first set electrically connecting together a plurality of different ones of said first contacts, a second set of electrical conducting means, each conducting means of said second set electrically connecting together a plurality of different ones of said second contacts, means for supporting and positioning said first and second contacts of each sensing means in a sensing surface for engaging said surface of said skin of said body member for measuring purposes, a source of electrical current, means for sequentially and separately coupling said source to each of said first conducting means, gate means for normally blocking the flow of current from each of said second conducting means, and means for controlling said gate means to allow current sequentially and separately to flow from each of said second conducting means during the time that said source is coupled to each of said first conducting means for obtaining a measure of said electrical parameter at a plurality of different points on said skin of said body member.

13. The device of claim 12 comprising:

means for obtaining a measure of the average value of said electrical parameter at a plurality of different points on the skin of a body member under investigation, and means for comparing said average value with said measurements of said electrical parameter as obtained at each of said plurality of different points on said skin of said body member under investigation.

14. A system for obtaining a measure of an electrical parameter of the skin of a body member at a plurality of different points comprising:

a device having a plurality of different sensing means for sensing for said electrical parameter at a plurality of different points on the skin, selecting means for sequentially selecting each sensing means for obtaining a measure of said electrical parameter at different points on the skin, means for controlling said selecting means to cycle said selecting means through its selection sequence at least twice, averaging means for obtaining an average value of said electrical parameter as sensed by said plurality of sensing means, comparing means for comparing the output of said averaging means with the output of each sensing means, and means for applying the output of each sensing means to said averaging means during one cycle and the output of each sensing means to said comparing means during a subsequent cycle.

15. The system of claim 14 wherein said comparison means forms the ratio between the output obtained by each sensing means and the output of said averaging means.

16. The system of claim 15 comprising:

means having a predetermined threshold for comparison with the output of said comparison means for obtaining a measurement of the presence or absence of skin contact with each sensing means of said device, said comparison means comprising automatic gain control means for adjusting the amplitude of its output as an inverse function of the electrical conductivity of the skin of the body member.

17. A device for measuring an electrical parameter of the skin of a body member comprising:

a first set of electrical conducting means electrically isolated from each other and having surfaces in a plane exposed for contacting the skin, each conducting means of said first set having a plurality of apertures extending therethrough, a second set of electrical conducting means electrically isolated from each other and from said first set of conducting means, said second set of conducting means being located below said first set of conducting means, and a plurality of contact members extending from each con-ducting means of said second set, each contact member extending through one of said aper-tures formed through said conducting means of said first set and having a surface in said plane exposed for contacting the skin, each contact member of said second set of said device being electrically isolated from said electrical conducting means of said first set.

18. A device for measuring an electrical property of the skin of a body member comprising:

a plurality of sensing means for obtaining a measure of an electrical property of said body member at a corresponding plurality of different locations on the surface of the skin of said body member, each of said sensing means comprising a different pair of adjacent contacts spaced from every other pair of contacts, there being no contact common to all pairs, and means for supporting each contact pair to engage the skin of said member at a corresponding one of said locations on the surface of the skin.

19. The device of claim 18 wherein said sensing means includes means for measuring the electrical conductance between the contacts of each pair of contacts.

20. The device of claim 18 further comprising means for sequentially and separately selecting different ones of said sensing means for sequentially and separately obtaining a measure of said electrical property at the corresponding locations on the surface of the skin of the body member.

21. The device of claim 18 further comprising means for producing an electrical signal having a magnitude proportional to the measure of the electrical property obtained at each of said different locations.

22. The device of claim 21 further comprising means for comparing each such electrical signal with a predetermined signal and for producing a resultant signal having a magnitude which is proportional to the ratio of the magnitude of the electrical signal to the magnitude of the predetermined signal.

23. A device for sensing a skin surface pattern of a human being by measuring electrical parameters of said skin surface comprising:

a plurality of closely spaced sensing means to detect the ridges and valleys of said skin surface, each said sensing means including a pair of adjacently spaced first and second contacts for contacting said surface of the skin, a first set of electrical conducting means, each con-duct-ing means of the first set electrically connect-ing together a plurality of different ones of said first contacts, a second set of electrical conducting means, each con-ducting means of said second set electrically connecting together a plurality of different ones of said second contacts, and means for supporting and positioning said first and second contacts of each sensing means in a sensing surface for engaging said surface of said skin for measuring purposes.

24. A device for measuring an electrical parameter of the skin of a body member comprising:

a plurality of spaced sensing means, each including a pair of adjacently spaced first and second contacts for contacting the surface of the skin of said body member, a first set of electrical conducting means, each conduct-ing means of the first set electrically connect-ing together a plurality of different ones of said first contacts, a second set of electrical conducting means, each con-ducting means of said second set electrically connecting together a plurality of different ones of said second contacts, means for supporting and positioning said first and second contacts of each sensing means in a sensing surface for engaging the surface of the skin of said body member for measuring purposes, and means for sequentially and separately selecting different ones of said pairs of first and second contacts for obtaining a measure of said electrical parameter between points on the skin of said body member contacted by the first and second contacts of each of said different ones of said pairs.

25. The device of claim 24 wherein said sensing means comprises means for measuring the electrical conductance between the first and second contacts of selected pairs of contacts.

26. The device of claim 24 further comprising means for producing electrical signals each of whose magnitudes is propor-tional to the measure of said electrical parameter obtained between said points contacted by the first and second contacts of each of said different ones of said pairs.

27. The device of claim 26 further comprising means responsive to each of said electrical signals for producing a digital signal representative of the electrical signal, and means for comparing each of said digital signals with one or more preselected digital signals.

* * * * *